Aug. 14, 1928.

L. L. STEWART 1,680,306

TRANSMISSION

Filed Aug. 12, 1927

INVENTOR
Lawrence L. Stewart
BY
ATTORNEY

UNITED STATES PATENT OFFICE.

LAWRENCE L. STEWART, OF KANSAS CITY, MISSOURI.

TRANSMISSION.

Application filed August 12, 1927. Serial No. 212,493.

My invention relates to transmissions and particularly to means for combining different types of change gear sets, the immediate objects of the invention being to increase the range of gear ratios and thus the efficiency of motor vehicles normally equipped with the planetary type of transmission.

In accomplishing this object I have provided improved details of structure, the preferred forms of which are illustrated in the accompanying drawings, wherein.

Figure 1:
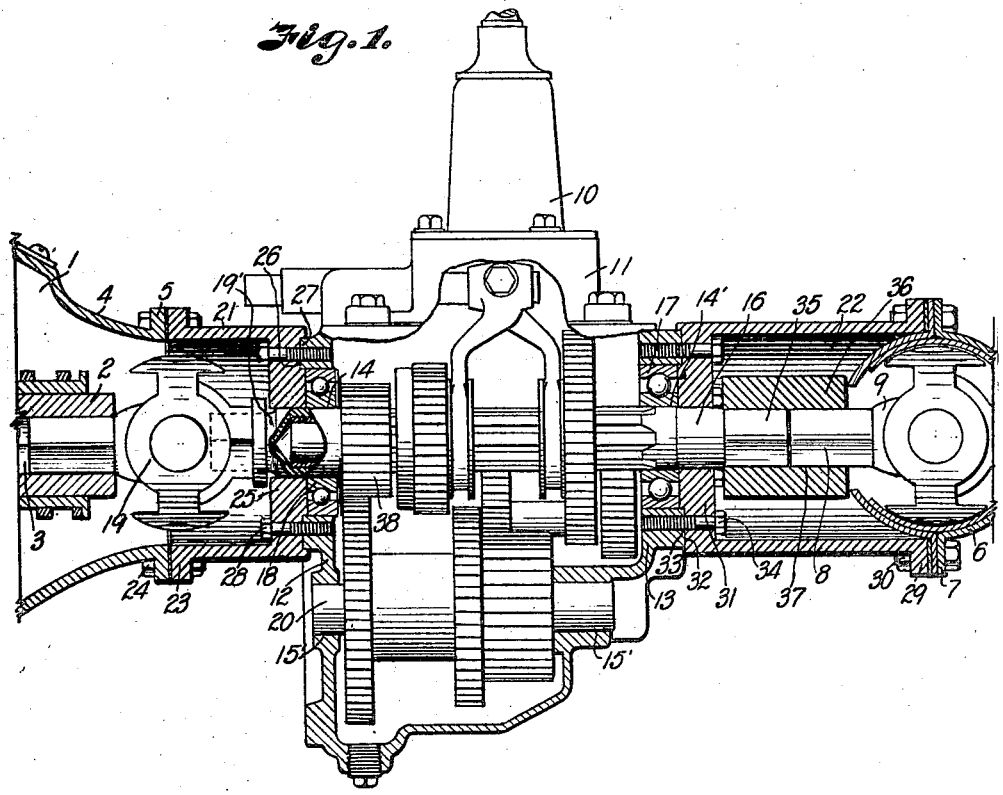
Fig. 1 is a longitudinal, vertical sectional view of a selective type transmission and means of associating the same with representative elements of a planetary transmission.
Figure 2:
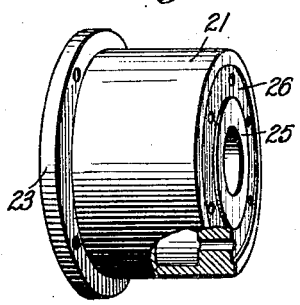
Fig. 2 is a perspective view of an adapter for positioning between the two change gear sets.
Figure 3:
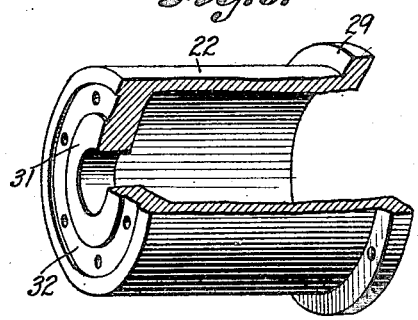
Fig. 3 is a perspective view of an adapter for positioning between an interposed gear set and the universal housing.
Figure 4:
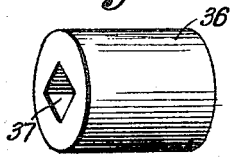
Fig. 4 is a perspective view of a sleeve joining the stub shaft portion of the rearward universal joint with the main drive shaft.

Referring more in detail to the drawings: 1 designates generally a planetary-type transmission including a member 2 which delivers the power from the planetary transmission having a socket 3, and a housing 4 having a peripheral flange 5. A universal joint represented by the casing 6 having a mating flange 7 is ordinarily secured to the planetary transmission housing 4, a squared stub shaft 8 of a universal joint member 9 in ordinary practice being received by the socket of the transmission member 2 for rotation of said squared shaft by the transmission.

My invention involves the introduction of a selective change gear set or transmission 10 between the planetary transmission 1 and the universal joint 6 so that the selective sliding gear set may add the additional number of its gear changes to the range of gear ratios provided by the planetary transmission. The selective transmission 10 which is illustrated in the drawings is a usual form comprising a casing 11 having a front wall 12 and a rear wall 13, the walls being provided with the aligned openings 14—14′ and 15—15′, and having a transmission shaft 16. The openings 14—14′ are provided respectively with bearings 17 and 18. The bearing 17 receives the rear end of the transmission shaft 16.

I interpose between the planetary set and the selective set a universal joint element 19 having a sleeve-ended shaft member 19′, which is journaled in the bearing 18 and receives rotatably the forward end of the transmission shaft 16.

The bearing openings 15—15′ are provided for journaling the counter or lay shaft 20, on which fixed gears are provided as usual for selective meshing with sliding gears on the transmission shaft.

The selective sliding gear set is supported by and connected to the planetary transmission elements and the universal 6, by means including two adapters, a short front adapter 21 and a longer rear adapter 22. The front adapter serves as a housing for the interposed universal joint, and is provided with a forward annular external flange 23 for mating with the annular flange 5 of the planetary transmission housing 4 and is secured thereto by bolts 24; the opposite end of the adapter having an internal annular flange 25 constituting a journal for the sleeve member 19 in co-operation with the bearing 18 of the selective transmission; and having in its rear face an annular recess 26, to receive an outstanding annular flange 27 of the front wall of the selective transmission, the front adapter and the selective transmission casing being securely connected by bolts 28 extending through said flanges 25 and 27.

The rear and longer adapter 22 is substantially identical with the front adapter, except in length, having an exterior annular flange 29 for securing the adapter by bolts 30 to the mating flange 7 of the universal joint casing 6; and an internal bearing flange 31 to receive the transmission shaft, in which flange is a facing annular recess 32 to receive an outstanding annular flange 33 of the rear wall 13 of the selective transmission casing. Bolts 34 extending through the flanges of the adapter and the rear wall 13 secure the two members, to complete the arrangement whereby the selective type transmission element is incorporated in the transmission assembly of the vehicle.

The transmission shaft 16, which may be the conventional transmission shaft of a selective transmission, has a squared rear end 35. In my invention the shaft 16 and its squared end 35 are aligned with and positioned adjacent the squared shaft portion 8 of the universal joint member 6, and a cylindrical coupling member 36 having a squared axial opening 37 is seated as a sleeve member over the aligned and adjacent ends of said squared shaft elements 35 and 8 and connects the two, enabling the transmission shaft to actuate the universal joint member.

A vehicle may thus be provided with both a planetary type of transmission and a selective sliding gear type transmission, the selective transmission being interposed between the planetary transmission housing and the universal joint casing, and a second universal joint being installed between the planetary set and the sliding gear set. The adapters are of suitable length for fitting in the situations for which they are designed, one between the two transmission sets and one between the interposed transmission and universal joint. The recessed faces on the internal bearing flanges of the adapters, engaging the outstanding flanges of the selective transmission walls, and the external adapter flanges mating with the normal flanges of the vehicle's transmission and universal joint housings, provide secure and firm connections. Thus the adapters may support the selective gear set on and connected with the planetary transmission elements and universal joint for effective operation; the delivery or transmission shaft being keyed with the universal joint stub by means of the coupling sleeve. The actuation of the planetary transmission normally provided for the vehicle, at one of the several speeds provided therefor, for example, two speeds forward and one reverse, causes the rotation of the sleeve 20 and driving gear 38 at a selected speed. The gear 38 actuates the elements of the selective gear set in the usual manner, whereby the speed is further modified, and different gear ratios provided for power purposes, either through increasing or decreasing the speed transmitted from the planetary set. The speed so modified is delivered through the squared end of the transmission shaft to the sleeve member and by it to the squared shaft portion of the universal joint member for delivery to the axle.

Thus it is apparent that the means of associating a selective type change gear set with a planetary transmission provides additional forward and reverse speeds for the vehicle equipped originally with the planetary transmission.

While I have described my device as comprising adapters combining a selective sliding gear set with a planetary system, using the original elements of the two sets, the disclosure will suggest to persons of ordinary skill the application of the invention to other elements, and the use of members more radically modified or the use of substitute members. For example, other than the named conventional transmission elements may be combined or a special shaft may be provided to serve in the place of the universal joint to suit a particular condition.

What I claim and desire to secure by Letters Patent is:

An adapter having an exterior annular flange for attachment to a transmission housing, an internal annular flange for attachment to a second transmission housing, and a bearing opening to receive the driving member of the second named transmission.

In testimony whereof I affix my signature.

LAWRENCE L. STEWART.